Feb. 26, 1952 L. E. SOUTHWARD ET AL 2,587,007
FISHHOLDER
Filed Sept. 29, 1949
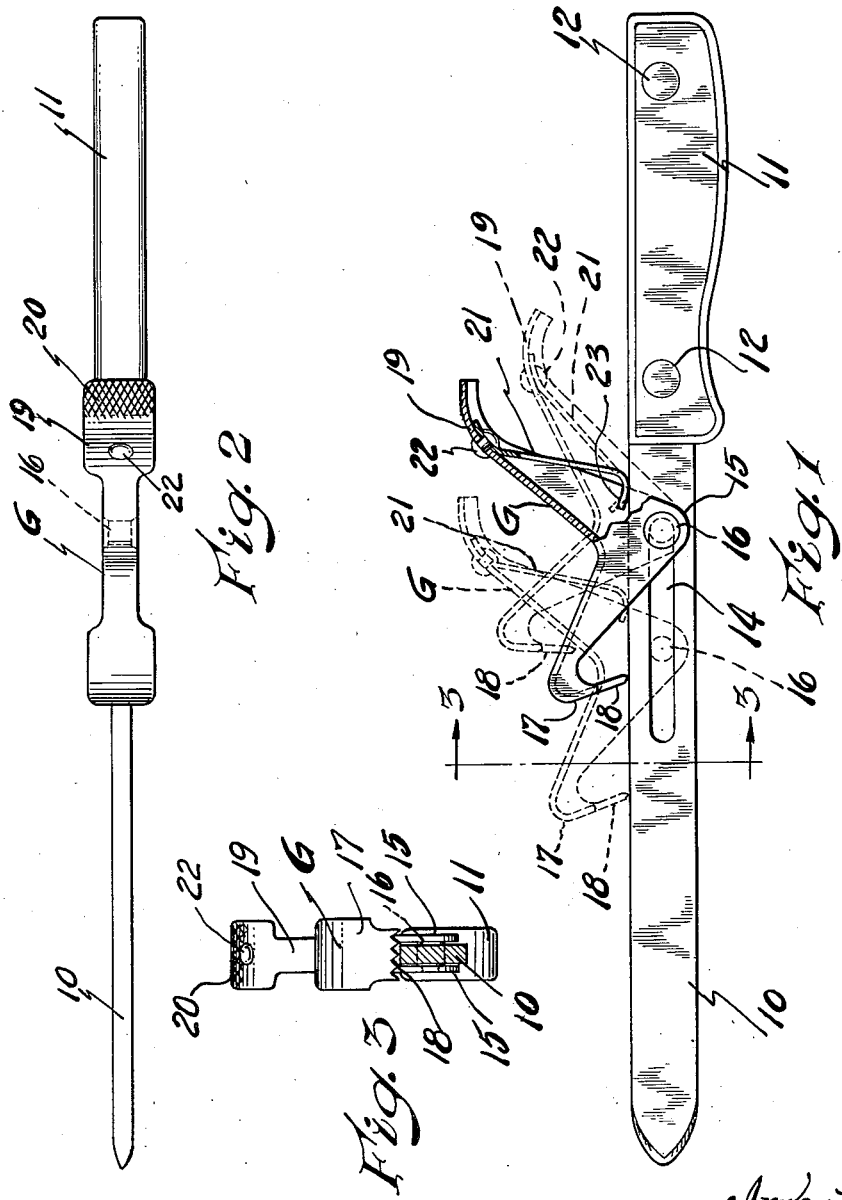
Inventors
Lisle E. Southward.
Ellis W. Southward.
BY
Frank C. Fearman.
ATTORNEY Patented Feb. 26, 1952

2,587,007

UNITED STATES PATENT OFFICE 2,587,007

FISHHOLDER

Lisle E. Southward and Ellis W. Southward,
Au Gres, Mich.

Application September 29, 1949, Serial No. 118,638

1 Claim. (Cl. 17—7)

Our invention relates to fishholders, and more particularly to a fishholder provided with means for firmly gripping and supporting the body of a fish during the scaling and cleaning operation.

One of the prime objects of the invention is to provide a fishholder which includes a blade-like member for rigidly supporting the body of the fish during the scaling and cleaning operation, and further provides a tensioned gripping jaw for firmly engaging and securing the fish in position on the blade.

A further object of our invention is to provide a fishholder including a longitudinally adjustable gripping jaw which can be easily and quickly adjusted to suit various sizes of fish, and provide quickly releasable means for frictionally securing the gripping jaw in set position.

Still a further object of our invention is to provide a fishholder of the type described, which is sturdy and durable, and of such dimensions as to easily fit inside a conventional tackle box.

A further object still is to provide a fishholder which is very easy to operate, that is streamlined in appearance, and which can be easily and economically manufactured and assembled.

With the above and other objects in view, the present invention consists in the combination and arrangement of parts, hereinafter more fully described, illustrated in the accompanying drawing, and more particularly pointed out in the appended claim, it being understood that changes may be made in the form, size, proportion, and minor details of construction, without departing from the spirit or sacrificing any of the advantages of the invention.

In the drawing:

Fig. 1 is a side-elevational view of our fishholder, the broken lines indicating various positions of adjustment of the gripping member.

Fig. 2 is a top, plan view thereof.

Fig. 3 is a transverse-sectional view taken on the line 3—3 of Fig. 1.

Referring now more particularly to the accompanying drawing in which we have shown the preferred embodiment of our invention, the letter F indicates the fishholder and comprises an elongated blade-like member 10, the one end of which is rounded and pointed to facilitate entry into the fish (not shown), and a suitable handle 11 is secured to the opposite end of the blade by means of rivets 12 as usual, said handle being shaped so that it smoothly fits into the hand of the user.

An elongated slot 14 is provided in the blade 10 at a point directly adjacent the handle, and a preferably stamped gripping member G is slidably mounted on said blade, said member being substantially triangular in shape and is formed with depending ears 15 which straddle the blade, and a pin 16 extends through said ears and slot 14 for securing the gripping member on the blade.

The triangular-shaped gripping member G is formed as clearly shown in Fig. 1 of the drawing, the front end comprising downwardly and inwardly hooked jaw section 17 terminating in a serrated edge or toothed portion 18 (see Fig. 3 of the drawing).

The rear edge 19 of the gripping member extends upwardly as shown, being knurled as at 20 to form a thumb-rest rearward of the pin 16, and a flat leaf spring 21 of predetermined shape is secured to the upper end of the section 19 by means of a rivet 22 or the like, the lower end of the spring being turned as at 23 and bears on the upper edge of the blade and is normally flexed sufficiently to force the serrated edge against said blade.

The shape of the spring 21 is of extreme importance, due to the face that it must firmly hold the jaw in engagement with the head of the fish, but it must also be readily releasable to permit the gripping member to be readily shifted and adjusted, the length of the slot limiting the range of the adjustment.

When the gripping member is in position shown in solid lines in Fig. 1, and it is desired to adjust it on the blade, the user presses the free end of the spring 21 toward the section 19, relieving the tension on and friction with the blade, and the member can then be moved on the blade as desired. When the spring is released, it springs back to original position and securely holds the member in set position.

In practice, the blade member 10 is inserted through the mouth and into the body of the fish; the gripping member is longitudinally adjusted on the blade and pressure on the knurled end 20 raises the serrated jaw end so that it engages the head of the fish and secures it on the blade, after which the fish can be scaled and cleaned or otherwise handled as desired.

The fish is easily released when the cleaning and scaling operations have been completed by merely pressing down on the section 19 to pivot the gripping member about the pivot 15 and the fish can then be freely withdrawn from the blade.

What we claim is:

A fishholder of the type described comprising an elongated blade, a substantially triangular-shaped gripping member pivotally mounted on said blade and formed with a front jaw portion and a rear upwardly extending handle portion, and a vertically disposed leaf spring having its one end rigidly connected to the upper end of said handle portion at a point spaced directly adjacent the upper end thereof, the lower free end of the spring being upwardly curved, with the curved end bearing on the upper edge of the blade for frictional engagement therewith to permit the gripping member to be actuated to swing the jaw portion upwardly without shifting the free end of the spring on said blade.

LISLE E. SOUTHWARD.
ELLIS W. SOUTHWARD.

REFERENCES CITED

The following references are of record in the file of this patent:

UNITED STATES PATENTS

| Number | Name | Date |
|---|---|---|
| 2,298,580 | Miron | Oct. 13, 1942 |

FOREIGN PATENTS

| Number | Country | Date |
|---|---|---|
| 45,794 | Sweden | Sept. 20, 1919 |